United States Patent
Onishi

(10) Patent No.: US 6,977,451 B2
(45) Date of Patent: Dec. 20, 2005

(54) IRONLESS AC LINEAR MOTOR

(75) Inventor: Yoshinori Onishi, Sakai-gun (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 10/920,409

(22) Filed: Aug. 18, 2004

(65) Prior Publication Data

US 2005/0012404 A1 Jan. 20, 2005

(30) Foreign Application Priority Data

May 11, 2002 (JP) ......................................... 2002-320675

(51) Int. Cl.⁷ ............................................. H02K 41/00
(52) U.S. Cl. ........................................ 310/12; 310/54
(58) Field of Search ......................... 310/12–22, 52–62

(56) References Cited

FOREIGN PATENT DOCUMENTS

| EP | 1 258 970 A1 | 11/2002 | | |
|---|---|---|---|---|
| JP | 6-62787 | 9/1994 | | |
| JP | 10-23735 | 1/1998 | | |
| JP | 2001-275335 | 10/2001 | | |
| JP | 2002-34229 | 1/2002 | | |
| JP | 2002044932 A | * 2/2002 | .......... | H02K/41/03 |
| JP | 2002119039 A | * 4/2002 | .......... | H02K/41/03 |
| JP | 2002218730 A | * 8/2002 | .......... | H02K/41/03 |
| JP | 2003-230264 | 8/2003 | | |
| JP | 2004159390 A | * 6/2004 | .......... | H02K/41/02 |

* cited by examiner

Primary Examiner—Burton S. Mullins
Assistant Examiner—Heba Elkassabgi
(74) Attorney, Agent, or Firm—McDermott Will & Emery LLP

(57) ABSTRACT

An ironless AC linear motor for generating a thrust such that a carrier can move relative to a stator along a movement axis, includes parallel rows of permanent magnets arranged along the movement axis with a given magnet pitch to form a magnetic gap, a row of ironless coils having through holes and a manifold connected to the cooling tubes for distributing the coolant having a length equal to the magnet pitch in the direction of the movement axis.

8 Claims, 3 Drawing Sheets

IRONLESS AC LINEAR MOTOR

FIELD OF THE INVENTION

The present invention relates to a linear motor and, more specifically, the present invention relates to an ironless AC linear motor having cooling tubes for cooling ironless coils.

BACKGROUND OF THE INVENTION

An ironless linear motor is preferable for machining tools and semiconductor manufacturing devices which need precise positioning since it has no cogging caused by an iron core. Japanese Patent Laid-Open No. 10-23735 discloses an ironless AC multi-phase linear motor having cooling tubes for cooling ironless coils. A carrier of this linear motor includes permanent magnets which are provided on a magnet plate so as to form a magnetic gap, and a stator includes U-phase, V-phase and W-phase ironless coils arranged in a row in the movement direction. Two copper round pipes as cooling tubes pass through holes of the ironless coils. The two round pipes are remote from each other sandwiching the magnetic gap such that a magnetic flux generated by permanent magnets does not penetrate the two round pipes. Therefore, eddy current, which is generated when an electrically conductive body crosses the magnetic field, is prevented and viscous resistance is not generated.

Japanese patent Laid-Open No. 10-23735 further discloses a single, flat, cooling tube keeping in touch with all inner surfaces of ironless coils. This flat cooling tube has a higher cooling efficiency than the two round pipes. The Japanese Patent Laid-Open No. 10-23735 further discloses a single flat multi-bore cooling tube formed by adhering eight cooling pipes insulated from each other. The flat multi-bore cooling tube increases cooling efficiency and decreases eddy current.

The above-noted technology and other related technology does not have a high cooling efficiency which can reduce cogging and keep a constant thrust in a simple way and does not have a high cooling efficiency which can reduce viscous resistance.

SUMMARY OF THE INVENTION

An object of the present invention is to provide an ironless AC linear motor having a high cooling efficiency which can reduce cogging and keep a constant thrust in a simple way.

A further object of the present invention is to provide an ironless AC linear motor having a high cooling efficiency which can reduce viscous resistance.

According to the present invention, an ironless AC linear motor for generating a thrust such that a carrier can move relative to a stator along a movement axis (X). The ironless AC linear motor includes parallel rows of permanent magnets arranged along the movement axis with a given magnet pitch (P) to form a magnetic gap (10) therebetween, a row of ironless coils having through holes, a plurality of coolant tubes arranged in the magnetic gap and passing through the through holes of the ironless coils, and a manifold (6, 7) to which one ends of the coolant tubes are connected to the manifold having the length (B) equal to the magnet pitch in the direction of the movement axis.

According to the present invention, the manifold and plurality of cooling tubes are made preferably from a nonmagnetic austenitic stainless steel. Because the austenitic stainless steel has a high electrical resistance, eddy current is reduced. Further, it is preferable that the plurality of coolant tubes are spaced from each other with a small space to reduce eddy current.

DETAILED DESCRIPTION OF THE INVENTION

Figure 1:
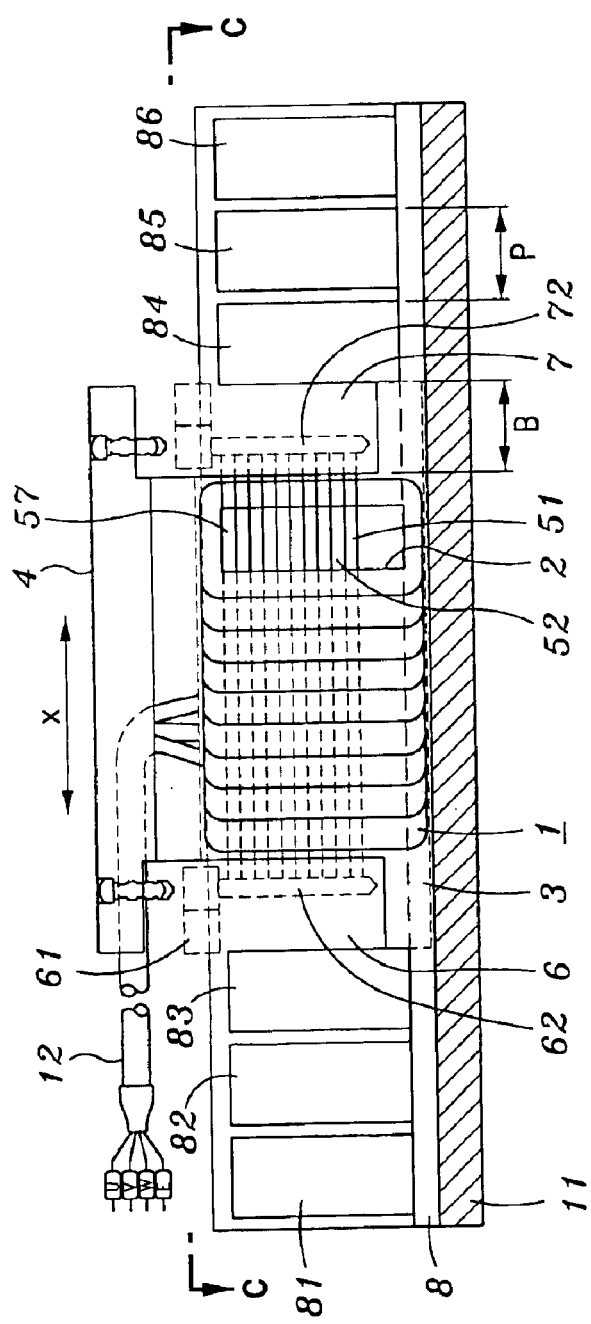
FIG. 1 is a side cross-sectional drawing of an ironless AC linear motor in accordance with the present invention.
Figure 2:
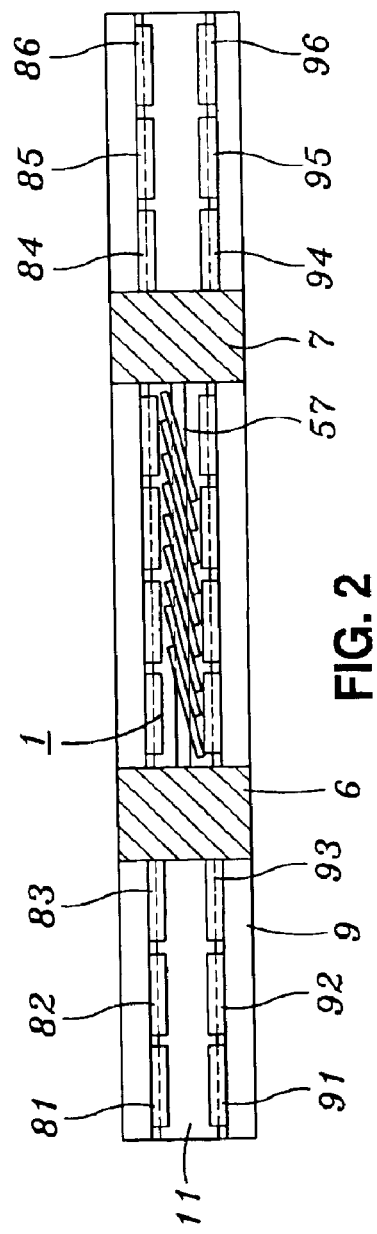
FIG. 2 is a plan view of the ironless AC linear motor viewed along line C—C in FIG. 1.

As shown in FIG. 1, the ironless AC multi-phase linear motor generates a thrust causing a linear motion between a primary and a secondary of the motor along a horizontal movement axis X. At the secondary for the linear motor comprises a pair of spaced side yokes 8 and 9, a center yoke 11, and parallel rows of permanent magnets 81 to 86 and 91 to 96. Although the linear motor is described and illustrated as having six pairs of permanent magnets, further embodiments of the present invention use fewer or more permanent magnets. For example, in alternate arrangements the linear motor includes four pairs of permanent magnets, or eight pairs of permanent magnets. The pair of side yokes 8 and 9 are arranged parallel to each other, and are connected by the center yoke 11. The parallel rows of permanent magnets 81 to 86 and 91 to 96 are mounted on the side of yokes 8 and 9, respectively, to form a magnetic gap 10 therebetween. Successive magnets of each of the rows are of alternate polarity. As shown in FIG. 1, the permanent magnets 81 to 86 and 91 to 96 are arranged with a given magnet pitch P along the axis X.

Figure 4:
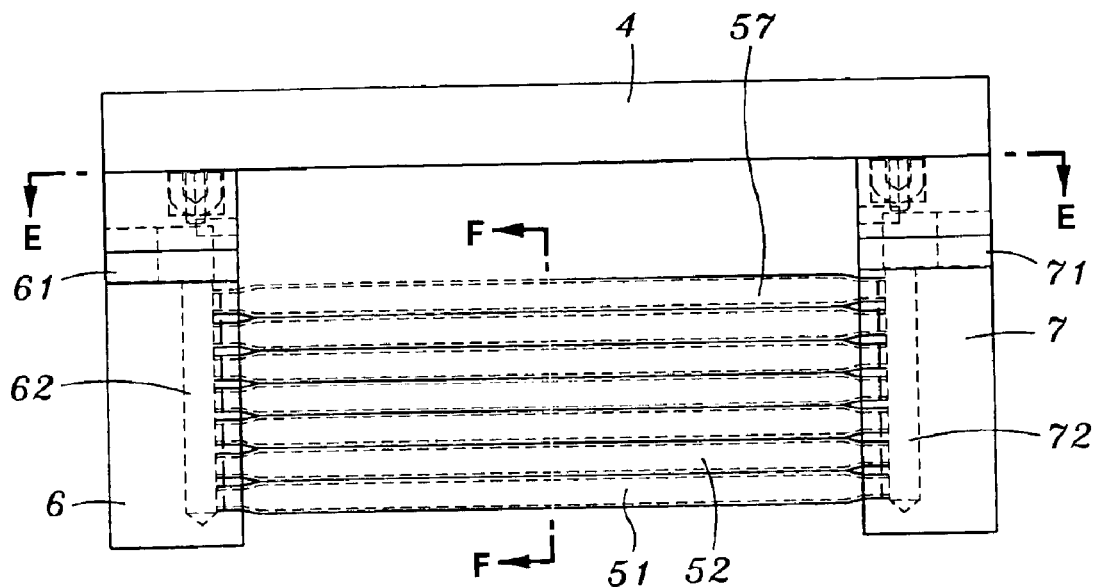
FIG. 4 is a side view of the frame assembly of the ironless AC linear motor of FIG. 1.
Figure 5:
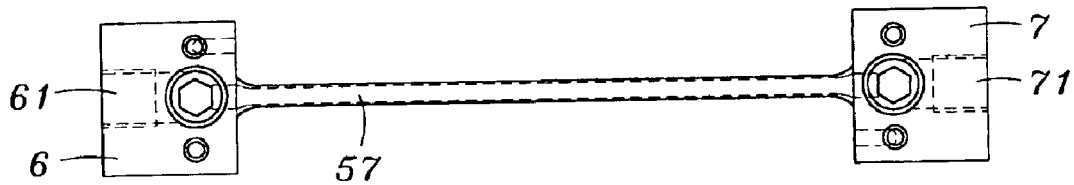
FIG. 5 is a plan view of the frame assembly viewed along line E—E in FIG. 4.
Figure 6:
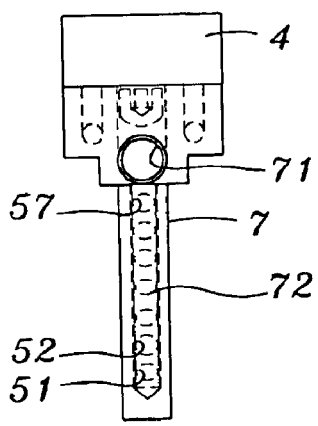
FIG. 6 is a front view of the frame assembly of FIG. 4.

The primary for the linear motor comprises a frame assembly and a plurality of flat ironless coils 1. As shown in FIGS. 4, 5 and 6, the frame assembly is constituted by a base plate 4, a pair of manifolds 6 and 7, and a plurality of cooling tubes 51 to 57. Although the linear motor is described and illustrated as having seven cooling tubes, further embodiments of the present invention use fewer or more cooling tubes. As an example, in alternate arrangements the linear motor includes five cooling tubes, or nine cooling tubes. The base plate 4 is spaced apart from the magnetic gap 10 and extends in parallel to the axis X. The pair of manifolds 6 and 7 are attached on respective ends of the base plate 4 and extend down toward the magnetic gap 10.

Figure 8:
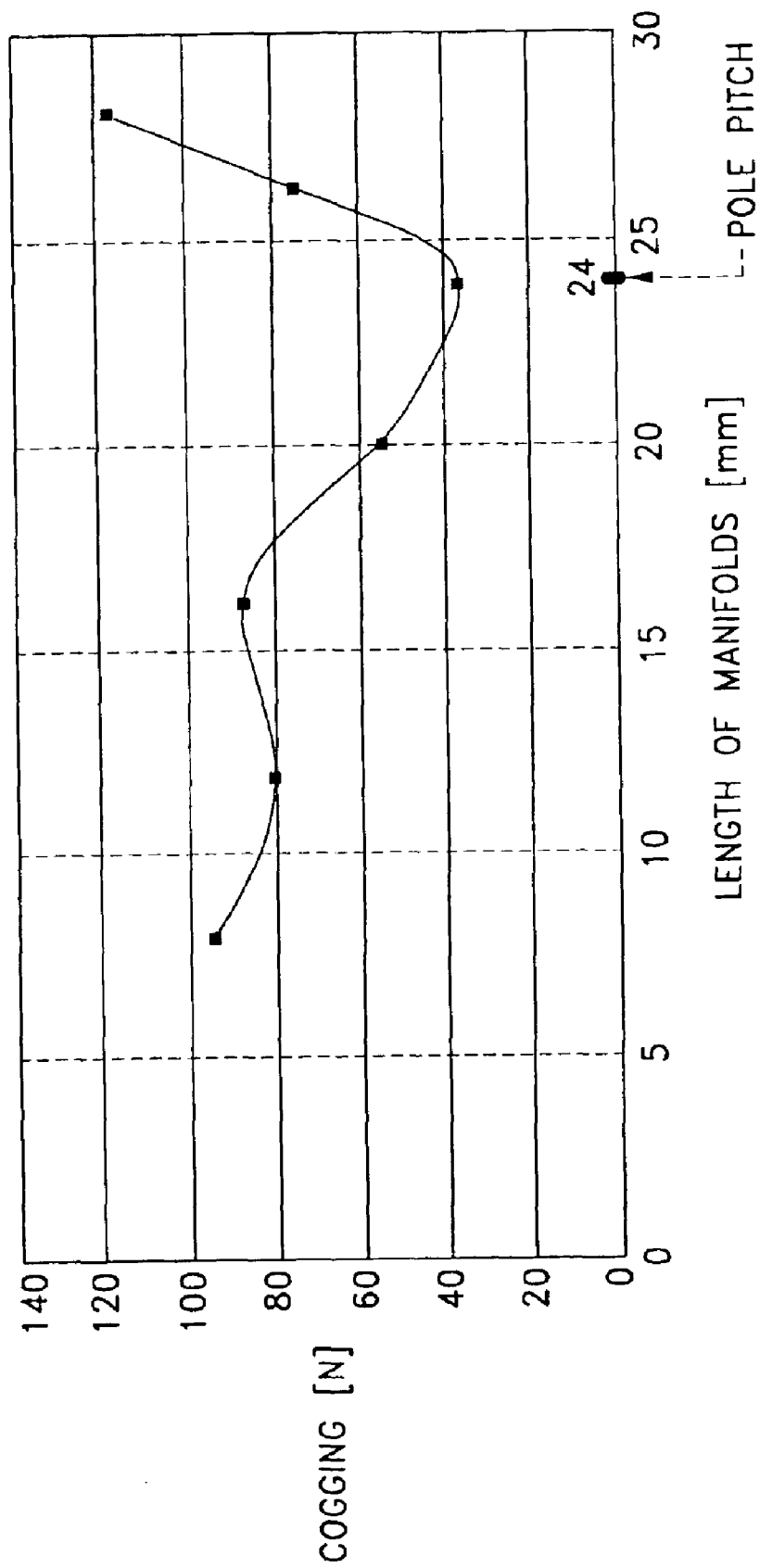
FIG. 8 is a graph showing relationship between the length of the manifold and cogging.

As shown in FIG. 1, as the manifolds 6 and 7 have a length B equal to the magnet pitch P in the direction of the axis X, magnetic repulsion and attraction generated between the permanent magnets and the manifolds 6 and 7 are balanced. As a result, as shown in the graph of FIG. 8, cogging is drastically decreased and positioning settling time is shortened.

The manifolds 6 and 7 have respective openings 61 and 71 as an inlet or outlet for coolant. Each of the cooling tubes 51 to 57 extend in parallel to the axis X and arranged in a row in the perpendicular direction. One end of the cooling tubes is connected is connected to the manifold 6 by brazing or welding and the other end thereof is connected to the manifold 7 in the same manner. The manifolds 6 and 7 have respective coolant passages 62 and 72. Coolant is distributed to the cooling tubes 51 to 57 from one of the coolant passages 62 and 72, and collected at the other of the coolant passages. Each cooling tube 51 to 57 and the greater part of the manifolds 6 and 7 are positioned in the magnetic gap 10.

The manifolds 6 and 7 are preferably made of stainless steel. Because stainless steel has a high electrical resistance, eddy current is reduced. It is further preferable that the manifolds 6 and 7 are made of an austenitic stainless steel as defined in Japanese Industrial Standard SUS316L or SUS316LN. Though the austenitic stainless steel has weight nearly three times greater than that of an aluminum alloy at the maximum, it is nonmagnetic. Therefore, cogging due to magnetic attraction generated between the permanent magnets and the manifolds 6 and 7 is decreased. Further, the austenitic stainless steel is preferable because of its high rigidity and high corrosive characteristics which makes it resistant against a variety of coolants. Austenitic stainless steel is defined in Japanese Industrial Standard SUS316L is comprised of 18% of Cr, 14% of Ni, 2.5% of Mo, low-carbon and the balance being Fe, and has an electrical resistance ($\Omega \cdot$ cm) more than ten times higher than that of an aluminum alloy.

Figure 7:
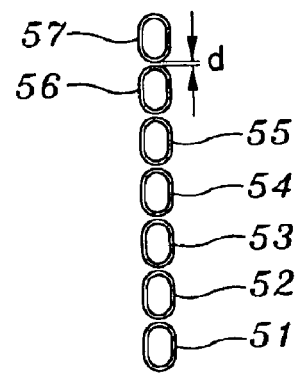
FIG. 7 is a cross sectional view of the cooling tubes viewed along line F—F in FIG. 4.

The cooling tubes 51 to 57 are also preferably made of an austenitic stainless steel instead of an electric conducting material such as an aluminum alloy, a copper or a copper alloy. As shown in FIG. 7, the adjoining cooling tubes are spaced apart from each other with a small space d to prevent flow of eddy current. As such, there is a reduction of eddy current and the viscous resistance of the linear motor is low.

Figure 3:
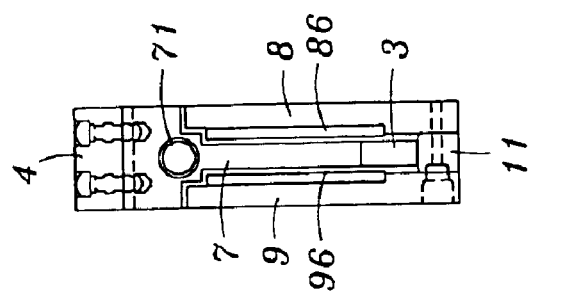
FIG. 3 is a front elevation of the ironless AC linear motor of FIG. 1.

In the illustrated embodiment, there are nine flat, three-phase ironless coils 1 of substantially rectangular shape which have U-phase, V-phase and W-phase and are arranged in that order repeatedly from left in FIG. 1 along the movement axis X. The cooling tubes 51 to 57 pass through all through holes 2 of the coils 1. Each ironless coil overlaps with one another, are touching the cooling tubes 51 to 57 and are covered by resin 3. The ironless coils 1 were made by winding an enamel coated copper wire of 0.44 mm diameter onto a preform frame of 17×50 mm section in 76 turns. The preform frame was pulled out and a resultant space corresponds to the through hole 2. AS shown in FIG. 1, lead wires 12 of coils 1 are pulled out through the base plate 4. The ironless coils 1 are covered with a mold and epoxy resin is filled into the mold. Thus, the ironless coils 1 are fixed to the manifolds 6 and 7 and the cooling tubes 51 to 57 by the hardened resin. In FIGS. 1 and 3, a resin block is formed by the mold.

The embodiment was selected for the purpose of explaining the essence and practical application of the invention. In light of the above description, various improvements are possible. For example, the cooling tubes 51 to 57 in the embodiment are arranged perpendicularly in a row, but a plurality of rows of cooling tubes could be arranged.

What is claimed is:

1. An ironless AC linear motor for generating a thrust such that a carrier can move relative to a stator along a movement axis, comprising:

parallel rows of permanent magnets arranged along the movement axis with a predetermined magnet pitch to form a magnetic gap therebetween;

a row of ironless coils having through holes;

a plurality of coolant tubes arranged in the magnetic gap and passing through the through holes of the ironless coils; and a manifold to which one end of the coolant tubes are connected, the manifold having a length equal to the magnet pitch in the direction of the movement axis.

2. The ironless AC linear motor according to claim 1, further comprising a second manifold to which the other end of the coolant tubes are connected, the second manifold having a length equal to the magnet pitch in the direction of the movement axis.

3. The ironless AC linear motor according to claim 1, wherein the ironless coils are flat and of substantially rectangular shape.

4. The ironless AC linear motor according to claim 1, wherein the ironless coils overlap with one another.

5. The ironless AC linear motor according to claim 1, wherein the ironless coils have U-phase, V-phase and W-phase and are arranged repeatedly in that order along the movement axis.

6. The ironless AC linear motor according to claim 1, wherein the plurality of coolant tubes are spaced apart from each other and extend in parallel with each other in the direction of the movement axis.

7. The ironless AC linear motor according to claim 1, wherein the plurality of coolant tubes are made of an austenitic stainless steel.

8. The ironless AC linear motor according to claim 1, wherein the manifold is made of an austenitic stainless steel.

* * * * *

UNITED STATES PATENT AND TRADEMARK OFFICE
CERTIFICATE OF CORRECTION

PATENT NO. : 6,977,451 B2
DATED : December 20, 2005
INVENTOR(S) : Yoshinori Onishi It is certified that error appears in the above-identified patent and that said Letters Patent is hereby corrected as shown below:

Title page,
Item [30], Foreign Application Priority Data, "May 11, 200" should read
-- November 5, 2002 --.

Signed and Sealed this

Sixth Day of June, 2006

JON W. DUDAS
*Director of the United States Patent and Trademark Office*